United States Patent
McNulty et al.

(10) Patent No.: US 7,533,519 B2
(45) Date of Patent: May 19, 2009

(54) THREE SENSOR COMPARISON RATIONALITY TEST

(75) Inventors: Michael J. McNulty, Lombard, IL (US); Christopher R. Ciesla, Palos Heights, IL (US); Christopher M. Kaas, Niles, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 534 days.

(21) Appl. No.: 11/270,006

(22) Filed: Nov. 9, 2005

(65) Prior Publication Data

US 2007/0101699 A1    May 10, 2007

(51) Int. Cl.
    *F01N 3/00*    (2006.01)
(52) U.S. Cl. .............................. 60/285; 60/274; 60/276; 60/277; 60/284
(58) Field of Classification Search ................... 60/277, 60/285, 297, 311, 274, 276, 284, 295
    See application file for complete search history.

(56) References Cited

U.S. PATENT DOCUMENTS

| | | | | |
|---|---|---|---|---|
| 4,953,351 A | * | 9/1990 | Motz et al. | 60/285 |
| 5,201,802 A | * | 4/1993 | Hirota et al. | 60/276 |
| 5,626,014 A | * | 5/1997 | Hepburn et al. | 60/274 |
| 5,950,422 A | * | 9/1999 | Dolling | 60/274 |
| 6,145,302 A | * | 11/2000 | Zhang et al. | 60/274 |
| 6,993,899 B2 | * | 2/2006 | Lewis et al. | 60/285 |

OTHER PUBLICATIONS

"Engine Manufacturer Diagnostic System Requirements for 2007 and Subsequent Model-Year Heavy-Duty Engines(EMD)," California Code of Regulations, Section 1971, Title 13.
Report from the International Searching Agency; International Application No. PCT/US06/43439; mailed on Aug. 12, 2008.

* cited by examiner

*Primary Examiner*—Binh Q. Tran
(74) *Attorney, Agent, or Firm*—Jack D. Nimz; Jeffrey P. Calfa

(57) ABSTRACT

Testing of temperature sensors (28, 30, 32) in an emission control system, such as in an exhaust system (10) of a diesel engine, serves to condition further component and/or system testing by determining that sufficient sensor cooling has occurred and that no sensor is "stuck within range" using a strategy (50).

28 Claims, 3 Drawing Sheets

THREE SENSOR COMPARISON RATIONALITY TEST

FIELD OF THE INVENTION

This invention relates generally to emission control systems of internal combustion engines, more particularly diesel engines that have exhaust gas treatment devices for treating exhaust gases passing through their exhaust systems. The invention further relates to a system and method for verifying the functionality of certain sensors associated with emission control devices, more especially temperature sensors associated with exhaust gas treatment devices, prior to subsequent diagnostic testing.

BACKGROUND OF THE INVENTION

A known system for treating exhaust gas passing through an exhaust system of a diesel engine comprises a diesel oxidation catalyst (DOC) upstream of a diesel particulate filter (DPF). The combination of these two exhaust gas treatment devices traps diesel particulate matter (DPM) and promotes chemical reactions in exhaust gas as it flows through the exhaust system from the engine, thereby preventing significant amounts of pollutants such as hydrocarbons, carbon monoxide, soot, SOF, and ash, from entering the atmosphere.

Certain sensors are associated with exhaust gas treatment devices like DOC's and DPF's in diesel engine exhaust systems. The sensors provide certain information for control and/or diagnostic purposes. The information may also be used for verifying compliance with relevant regulations. Such verification may require that the functionality of the sensors themselves be verified before further evaluation of the functionality of the exhaust gas treatment system.

Certain government regulations that are anticipated to become applicable to certain motor vehicle engines require certain diagnostic testing of emission control systems. A specific document entitled "Engine Manufacturer Diagnostic System Requirements For 2007 And Subsequent Model-Year Heavy-Duty Engines (EMD)" sets forth certain requirements for assuring functionality of diesel engine exhaust gas treatment systems. Functionality of the sensors associated with the exhaust gas treatment systems needs also to be assured.

Functionality testing of certain sensors is best performed when they are "cold". To confirm that they are indeed "cold", it has been proposed to use a timer to time the amount of time that an engine has been shut off since it last was running and to allow further testing only after a certain amount of time has elapsed on the timer.

Such a timer, which is typically implemented in the engine control system, requires power in order to run while the engine is shut off. Some existing engine control systems that are otherwise entirely suitable for use with exhaust gas treatment systems that are subject to the future regulation may not however possess features and the necessary hardware ("keep alive memory" or KAM for example) that allow for measuring engine off time.

Accordingly, a system and method that can verify sensor functionality without having to draw power from a vehicle battery or battery bank for measuring engine off time would be advantageous for those engines.

SUMMARY OF THE INVENTION

The present invention is directed toward such a system and method.

Sensor functionality is verified in several ways in the disclosed embodiment of the invention. Failure to verify sensor functionality in any of those ways disallows further diagnostic testing until subsequent sensor functionality testing verifies sensor functionality.

One generic aspect of the present invention, which is used to determine if a sensor is "stuck within range", relates to a method for conditioning performance of an emission control system test comprising processing temperature data from spaced apart locations along a flow path containing one or more emission control devices to develop a first set of data values each representing a respective temperature difference between a respective pair of locations.

The first set of data values is processed to develop a second set of data values each representing the difference between a respective pair of data values of the first set. Each data value of the second set and a respective reference value are processed to develop a third set of data values. Performance of the test is conditioned on the third set of data values.

Another generic aspect, that determines if at least one sensor has cooled down sufficiently for enabling sensor functionality to be verified, relates to a method for conditioning performance of an emission control system test by processing temperature data from spaced apart locations along a flow path containing one or more emission control devices to develop a first set of data values each representing a respective temperature at a respective location.

The first set of data values and a second set of data values representing respective highest temperatures measured earlier at the respective locations while flow was occurring through the flow path are processed to develop data values representing the difference between each data value of the first set and a respective data value of the second set. Performance of the test is conditioned on the difference between at least one of the data values of the first set and the respective data value of the second set being more than a respective defined difference.

The invention also relates to an internal combustion engine comprising an emission control system comprising temperature sensors disposed at spaced apart locations along a flow path containing one or more emission control devices providing a first set of data values each representing a respective temperature difference between a respective pair of locations.

A further aspect involves a processor processing the first set of data values to develop a second set of data values each representing the difference between a respective pair of data values of the first set, processing each data value of the second set and a respective reference value to develop a third set of data values, and conditioning performance of the test on the third set of data values.

A still further aspect involves the processor processing the first set of data values and a second set of data values representing respective highest temperatures measured earlier at the respective locations while flow was occurring through the flow path to develop data values representing the difference between each data value of the first set and a respective data value of the second set, and for conditioning performance of the test on the difference between at least one of the data values of the first set and the respective data value of the second set being more than a respective defined difference.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
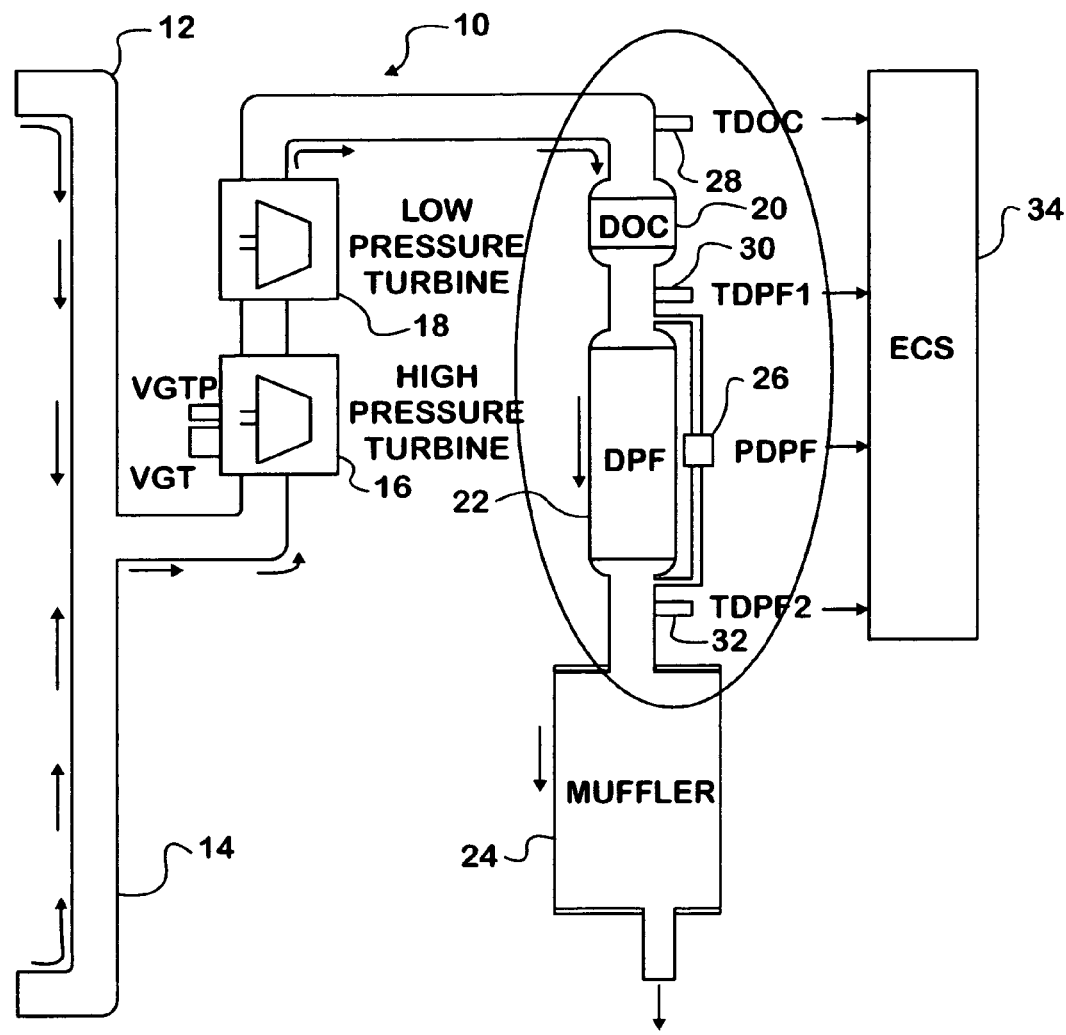
FIG. 1 is a general schematic diagram of a portion of an exemplary diesel engine exhaust system with which the present invention can be practiced.

FIG. 1 shows a diesel engine exhaust system 10 comprising branches 12, 14 from exhaust manifolds to successive turbine stages 16, 18 a two-stage turbocharger. Downstream of stage 18 in succession are a diesel oxidation catalyst (DOC) 20, a diesel particulate filter (DPF) 22, and a muffler 24.

When the engine is running to power a motor vehicle, exhaust gas exits engine combustion chambers to enter the exhaust manifolds and pass through branches 12, 14 where the flows merge to pass through the turbines stages and then DOC 20, DPF 22, and muffler 24 before passing to atmosphere through an exhaust pipe.

Although none are shown, it is possible that an exhaust system could have one or more valves associated with devices in the exhaust system in various ways. A by-pass valve shunting an exhaust system device and an engine exhaust brake would be examples.

A differential pressure sensor 26 is associated with DPF 22 to measure pressure drop through DPF 22. A DOC inlet temperature sensor 28 is disposed to measure temperature at the inlet of DOC 20. A DPF inlet temperature sensor 30 is disposed to measure temperature at the inlet of DPF 22. A DPF outlet temperature sensor 32 is disposed to measure temperature at the outlet of DPF 22.

These four sensors provide data to a processor-based engine control system (ECS) 34 that processes data from various sources to develop various control data for controlling various aspects of engine operation, including performing certain diagnostic testing.

Figure 2A:
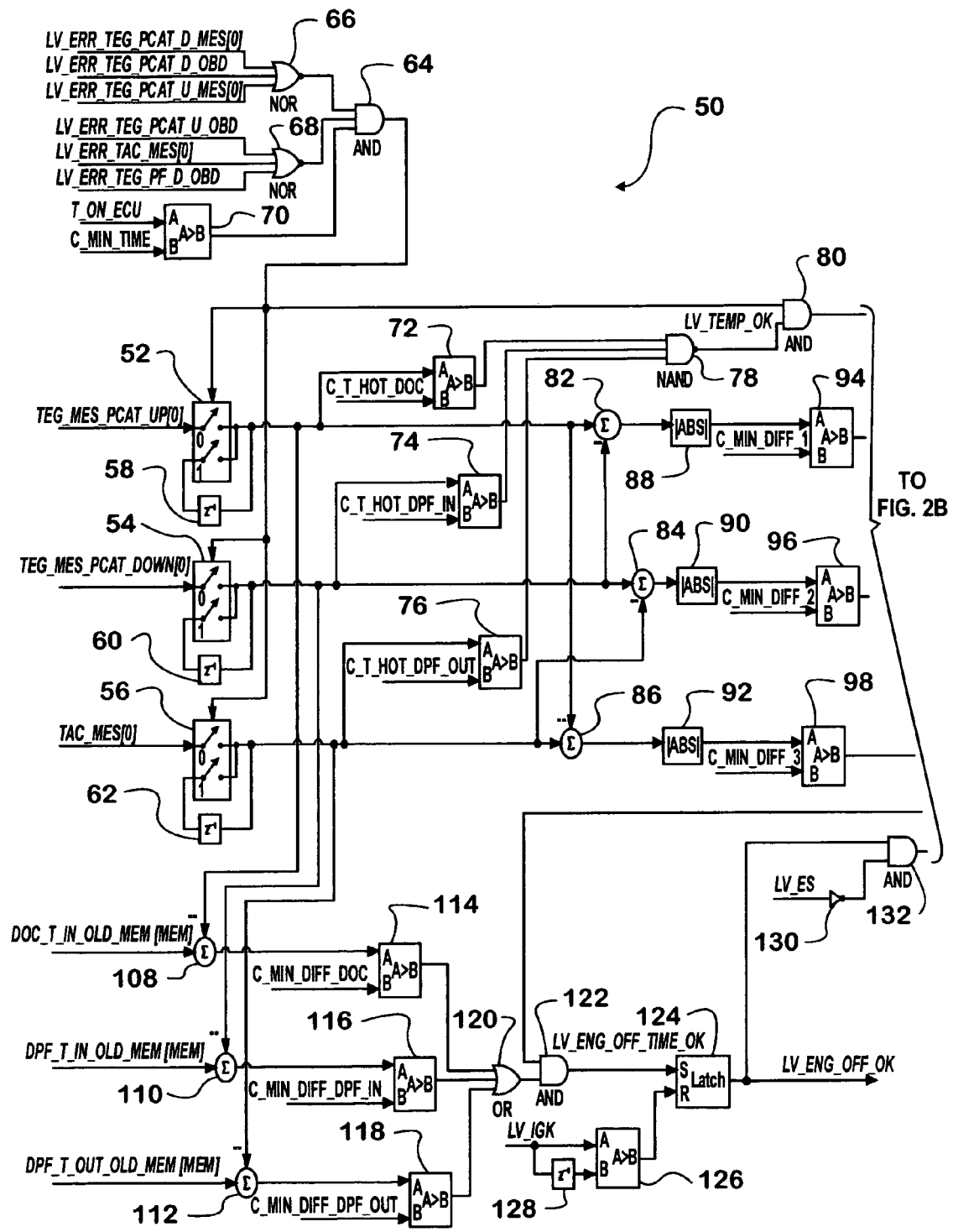
FIGS. 2A and 2B taken together comprise a software strategy diagram embodying principles of the invention.
Figure 2B:
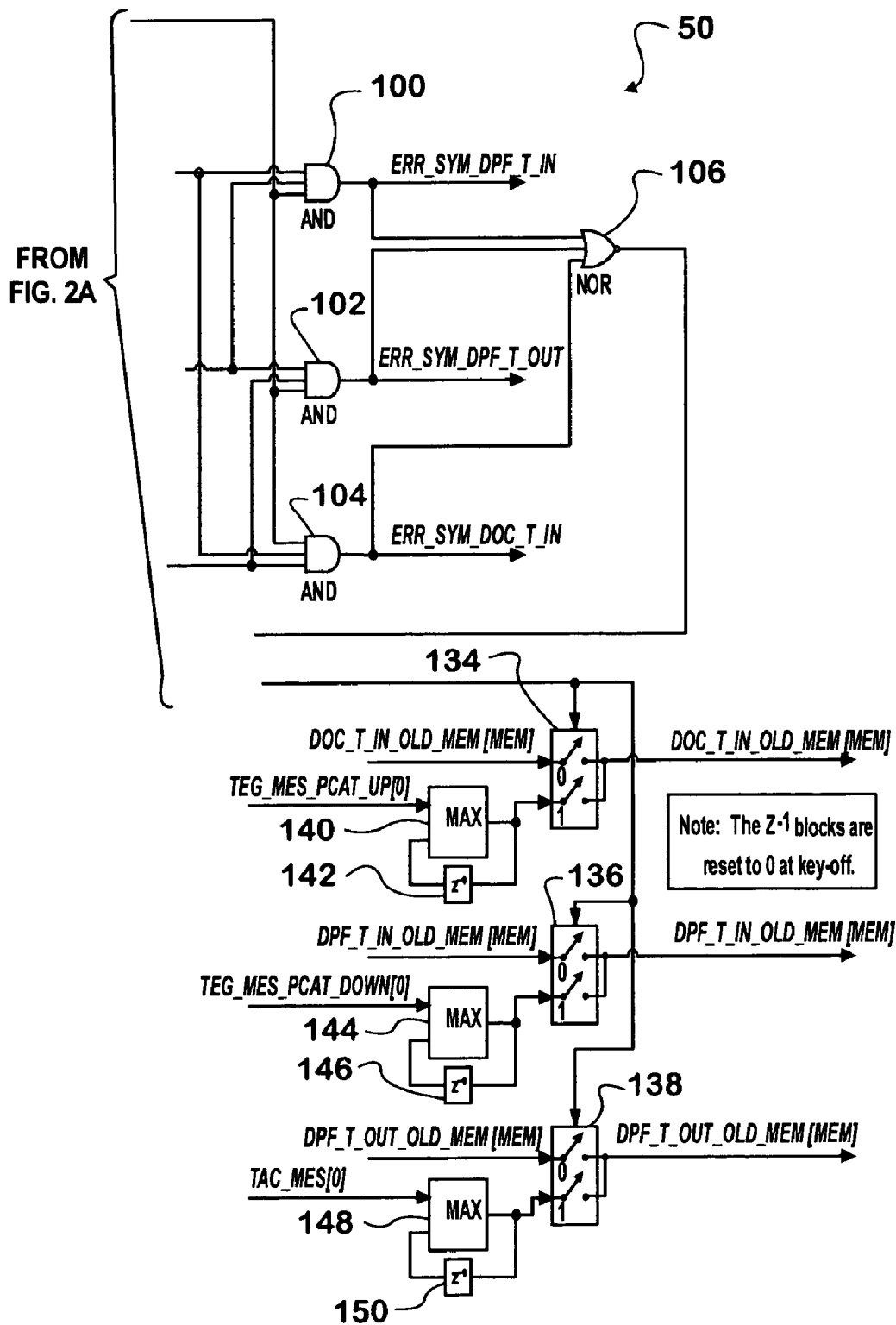

The inventive method is implemented in control system 34 by the strategy shown in diagram 50 of FIGS. 2A and 2B as an algorithm that is repeatedly executed as the engine operates. The algorithm comprises processing data from temperature sensors 28, 30, and 32 upon the ignition switch being turned on after the engine has been off to ascertain if the exhaust system has cooled sufficiently to allow "cold" testing of the sensors for verifying sensor functionality prior to further diagnostic testing. Hence, the inventive method may be considered to have several aspects, one of which is verifying functionality of the sensors themselves, and conditioning further diagnostic tests on verification of sensor functionality.

At power up, each sensor 28, 30, 32 is read by ECS 34 to develop a respective data value for a respective parameter TEG_MES_PCAT_UP[0], TEG_MES_PCAT_DOWN[0], TAC_MES[0] representing the temperature sensed at the respective sensor location in exhaust system 10. Further processing of each parameter by the algorithm is controlled by a respective switch function 52, 54, 56 with which a respective store 58, 60, 62 is associated as shown.

With each switch function 52, 54, 56 in its OFF state, no further processing of the temperature data occurs. When each switch function 52, 54, 56 switches to its ON state, further processing of temperature data occurs. Switching from OFF state to ON state occurs when conditions monitored by an AND logic function have been satisfied. Two NOR logic functions 66, 68 collectively form a single NOR logic function that assures that no relevant error flags identified by the various inputs to the NOR logic functions have been set. A comparison function 70 assures a slight delay time after the ignition switch has been turned on to allow any transients associated with power up to dissipate.

With switch functions 52, 54, 56 ON, data values for TEG_MES_PCAT_UP[0], TEG_MES_PCAT_DOWN[0], TAC_MES[0] are processed respectively by respective comparison functions 72, 74, 76. Each function 72, 74, 76 compares the data value for the respective stored sensor temperature with a data value for respective reference temperature C_T_HOT_DOC, C_T_HOT_DPF_IN, C_T_HOT_DPF_OUT. The purpose of these comparisons is to condition further performance of the sensor functionality test on any one of the sensors 72, 74, 76 indicating that it is sufficiently "cold" for a meaningful test to proceed. That a sensor is sufficiently "cold" is determined by monitoring results of the comparison functions by a NAND logic function 78. The state of NAND logic function 78 and that of AND logic function 64 determine the state of an AND logic function 80.

With switch functions 52, 54, 56 ON, stored data values for TEG_MES_PCAT_UP[0], TEG_MES_PCAT_DOWN[0], TAC_MES[0] are also processed by respective subtraction functions 82, 84, 86. Function 82 subtracts the data value representing the temperature of sensor 30 from the data value representing the temperature of sensor 28. Function 84 subtracts the data value representing the temperature of sensor 32 from the data value representing the temperature of sensor 30. Function 86 subtracts the data value representing the temperature of sensor 28 from the data value representing the temperature of sensor 32.

Next a respective absolute value function 88, 90, 92 processes the data value representing the respective difference calculated by the respective function 82, 84, 86 to yield a respective magnitude of the respective difference. The data value representing that respective magnitude is then processed by a respective comparison function 94, 96, 98.

Comparison function 94 compares the magnitude of the temperature difference between sensors 28 and 30 with a defined minimum value represented by parameter C_MIN_DIFF_1. Comparison function 96 compares the magnitude of the temperature difference between sensors 30 and 32 with a defined minimum value represented by parameter C_MIN_DIFF_2. Comparison function 98 compares the magnitude of the temperature difference between sensors 28 and 32 with a defined minimum value represented by parameter C_MIN_DIFF_3.

FIG. 2B shows that the results of those three comparisons are further monitored by respective AND logic functions 100, 102, 104. The state of AND logic function 80 is also monitored by each AND logic function 100, 102, 104. The state of each AND logic function 100, 102, 104 is identified by a respective parameter ERR_SYM_DPF_T_IN, ERR_SYM_DPF_T_OUT, ERR_SYM_DOC_T_IN, and those parameters determine the state of a NOR logic function 106.

FIG. 2A shows still further processing of stored data values for TEG_MES_PCAT_UP[0], TEG_MES_PCAT_DOWN[0], TAC_MES[0] by respective subtraction functions 108, 110, 112. Functions 108, 110, 112 subtract the respective stored data values for TEG_MES_PCAT_UP[0], TEG_MES_PCAT_DOWN[0], TAC_MES[0] from respective data values for parameters DOC_T_IN_OLD_MEM[MEM], DPF_T_IN_OLD_MEM [MEM], DPF_T_OUT_OLD_MEM[MEM].

The data values representing those differences are then processed by respective comparison functions 114, 116, 118. Comparison function 114 compares the difference between the data value for DOC_T_IN_OLD_MEM[MEM] and that for the stored value of TEG_MES_PCAT_UP[0]. Comparison function 116 compares the difference between the data value for DPF_T_IN_OLD_MEM[MEM] and that for the stored value of TEG_MES_PCAT_DOWN[0]. Comparison function 118 compares the difference between the data value for DPF_T_OUT_OLD_MEM[MEM] and that for the stored value of TAC_MES[0].

The results of those three comparisons control the state of an OR logic function 120. The state of OR logic function 120 and that of NOR logic function 106 determine the state of an AND logic function 122. The latter sets a latch function 124 when both OR logic function 120 and NOR logic function 106 assume logic "1" states. Consequently the test is allowed to be performed when it is disclosed both that at least one of the sensors is indicating a respective sensed temperature no greater than a predetermined temperature for the respective sensor at and below which it is permissible for the test to be performed and that no sensor is concurrently indicating a respective sensed temperature determined to be indicative of its non-functionality.

Latch function 124 is reset by a comparison function 126 with which a store 128 is associated as shown. Resetting occurs by the action of turning the ignition switch from OFF to ON. The parameter LV_IGK is a logic signal that assumes a "0" value when the ignition switch is off, and a "1" value when the ignition switch is on. When the value for LV_IGK changes, store 128 stores the value that existed immediately prior to the change. Hence, the act of switching the ignition switch from OFF to ON causes comparison function 126 to switch the data value to latch function 124 to a "1" thereby resetting latch function 124 to "0". The latter can be set only by AND logic function 122 switching a logic "1" to the latch function. That can occur only when NOR logic function 106 and OR logic function 120 are both in the logic "1" state.

A parameter LV_ENG_OFF_OK represents the state of latch function 124. When LV_ENG_OFF_OK switches from a "0" to a "1", the "1" signals that conditions precedent to performance of other diagnostic testing exist, thereby allowing such other testing to proceed. The switching of LV_ENG_OFF_OK from a "0" to a "1" is also one of two inputs to an AND logic function 132. The other input is the inverse of a parameter LV_ES, the inversion being provided by an inversion function 130.

AND logic function 132 serves to enable values for parameters DOC_T_IN_OLD_MEM[MEM], DPF_T_IN$_{OLD\_}$MEM[MEM], and DPF_T_OUT_OLD_MEM[MEM] to be updated as the engine continues to run, if they require updating in order to log the maximum temperature measured. The updating occurs via respective switch functions 134, 136, 138 that are switched ON when AND logic function 132 is placed in the logic "1" state.

A respective maximum value function 140, 144, 148 provides an updated value for the respective parameter DOC_T_IN_OLD_MEM[MEM], DPF_T_IN_OLD_MEM[MEM], and DPF_T_OUT_OLD_MEM[MEM], when switch functions 134, 136, 138 are ON. Each maximum value function determines the greater of one of two inputs to it. The current sensor temperature data TEG_MES_PCAT_UP[0], TEG_MES_PCAT_DOWN[0], and TEG_MES [0] are one of the inputs to the respective functions 140, 144, 148. The other input to each function 140, 144, 148 is from a corresponding store 142, 146, 150.

Each store 142, 146, 150 stores the result of each function 140, 144, 148 so that the maximum temperature measured while the engine is running will be the data value stored in memory for the respective parameter DOC_T_IN_OLD_MEM[MEM], DPF_T_IN_OLD_MEM[MEM], and DPF_T_OUT_OLD_MEM[MEM], to be used by functions 108, 110, 112 the next time that the engine is started after having been shut off.

When the engine is stopped, the parameter LV_ES causes the state of AND logic function 132 to switch to "0", thereby causing switch functions 134, 136, 138 to switch to OFF. The stores 142, 146, and 150 are also set to zero at key off.

From the foregoing description, the reader can now appreciate that the inventive method conditions performance of further diagnostic testing of the emission control system at engine start up on verification of at least one of the sensors being sufficiently "cold" and there being no sensor that is "stuck within range". A properly functioning sensor will closely follow temperature changes over the relevant temperature range to provide a reasonably accurate temperature measurement at the sensor location. Hence, they are expected to cool down in similar ways once the engine is shut off although their respective temperature ranges may be somewhat different due to their different locations in the exhaust system.

That at least one sensor has cooled down sufficiently is determined at engine start up by functions 72, 74, 76. That no sensor is stuck within range is determined by AND logic functions 100, 102, 104. If one sensor is stuck within range, it will be identified by one of the parameters ERR_SYM_DPF_T_IN, ERR_SYM_DPF_T_OUT, ERR_SYM_DOC_T_IN. By sensing temperature at engine start up, it is unnecessary to measure the time that the engine was off, thereby avoiding electric current consumption while the engine was off, and also certain hardware modifications to existing engine control systems.

While a presently preferred embodiment of the invention has been illustrated and described, it should be appreciated that principles of the invention apply to all embodiments falling within the scope of the following claims.

What is claimed is:

1. A method for conditioning performance of an emission control system test on a showing of temperature sensor functionality at engine start-up, the method comprising:

at engine start-up, processing temperature data from temperature sensors at respective spaced apart locations along a flow path containing one or more emission control devices to develop a first set of data values each representing a respective temperature difference between a respective pair of locations;

processing the first set of data values to develop a second set of data values each representing the difference between a respective pair of data values of the first set;

processing each data value of the second set and a respective reference value to develop a third set of data values; and conditioning performance of the test on the third set of data values disclosing both that at least one of the sensors is indicating a respective sensed temperature no greater than a predetermined temperature for the respective sensor at and below which it is permissible for the test to be performed and that no sensor is concurrently indicating a respective sensed temperature determined to be indicative of its non-functionality.

2. A method for conditioning performance of an emission control system test, the method comprising:

processing temperature data from spaced apart locations along a flow path containing one or more emission control devices to develop a first set of data values each representing a respective temperature difference between a respective pair of locations;

processing the first set of data values to develop a second set of data values each representing the difference between a respective pair of data values of the first set;

processing each data value of the second set and a respective reference value to develop a third set of data values; and conditioning performance of the test on the third set of data values, wherein the step of processing the first set of data values to develop a second set of data values comprises developing each data value of the second set as the absolute value of the difference between a respective pair of data values of the first set.

3. A method as set forth in claim 2 wherein the step of processing each data value of the second set and a respective reference value comprises comparing the absolute value of each data value of the second set and the respective reference value.

4. A method as set forth in claim 3 wherein the step of conditioning the performance of the test on the third set of data values comprises conditioning the performance on the absolute value of none of the data values of the second set exceeding the respective reference value.

5. A method as set forth in claim 4 including further conditioning the performance of the test on at least one of the data values of the first set representing a temperature less than a defined temperature.

6. A method as set forth in claim 5 further comprising processing the first set of data values and a fourth set of data values representing respective highest temperatures measured earlier at the respective locations while flow was occurring through the flow path to develop data values representing the difference between each data value of the first set and a respective data value of the fourth set, and further conditioning performance of the test on the difference between at least one of the data values of the first set and the respective data value of the fourth set being more than a respective defined difference.

7. A method for conditioning performance of an emission control system test, the method comprising:

processing temperature data from spaced apart locations along a flow path containing one or more emission control devices to develop a first set of data values each representing a respective temperature at a respective location;

processing the first set of data values and a second set of data values representing respective highest temperatures measured earlier at the respective locations while flow was occurring through the flow path to develop data values representing the difference between each data value of the first set and a respective data value of the second set;

and conditioning performance of the test on the difference between at least one of the data values of the first set and the respective data value of the second set being more than a respective defined difference.

8. A method as set forth in claim 7 wherein the step of processing temperature data from spaced apart locations along a flow path containing one or more emission control devices to develop a first set of data values each representing a respective temperature at a respective location comprises processing temperature data from spaced apart locations along a flow path that carries exhaust from an internal combustion engine containing one or more exhaust gas treatment devices to develop respective data values of the first set representing respective temperatures upstream and downstream of the one or more emission control devices.

9. A method as set forth in claim 7 wherein the step of processing temperature data from spaced apart locations along a flow path containing one or more emission control devices to develop a first set of data values each representing a respective temperature at a respective location comprises processing temperature data from spaced apart locations along a flow path for conveying exhaust from an internal combustion engine through a diesel oxidation catalyst and then a diesel particulate filter to develop respective data values of the first set representing respective temperatures upstream of the diesel oxidation catalyst, between the diesel oxidation catalyst and the diesel particulate filter, and downstream of the diesel particulate filter.

10. A method as set forth in claim 9 further including processing the first set of data values to develop a third set of data values each representing the difference between a respective pair of data values of the first set;

processing each data value of the third set and a respective reference value to develop a fourth set of data values; and further conditioning performance of the test on the fourth set of data values.

11. A method as set forth in claim 10 wherein the step of processing the first set of data values comprises developing each data value of the third set as the absolute value of the difference between a respective pair of data values of the first set.

12. A method as set forth in claim 11 wherein the step of processing each data value of the third set and a respective reference value comprises comparing the absolute value of each data value of the third set and the respective reference value.

13. A method as set forth in claim 12 wherein the step of further conditioning the performance of the test on the fourth set of data values comprises further conditioning the performance on the absolute value of none of the data values of the third set exceeding the respective reference value.

14. A method as set forth in claim 13 further including conditioning the performance of the test on at least one of the data values of the first set representing a temperature less than a defined temperature.

15. An internal combustion engine comprising:

an emission control system comprising temperature sensors disposed at spaced apart locations along a flow path containing one or more emission control devices providing a first set of data values each representing a respective temperature difference between a respective pair of locations;

and a processor for processing, at engine start-up, the first set of data values to develop a second set of data values each representing the difference between a respective pair of data values of the first set, for processing each data value of the second set and a respective reference value to develop a third set of data values, and conditioning performance of the test on the third set of data values disclosing both that at least one of the sensors is indicating a respective sensed temperature no greater than a predetermined temperature for the respective sensor at and below which it is permissible for the test to be performed and that no sensor is concurrently indicating a respective sensed temperature determined to be indicative of its non-functionality.

16. An internal combustion engine comprising:

an emission control system comprising temperature sensors disposed at spaced apart locations along a flow path containing one or more emission control devices providing a first set of data values each representing a respective temperature difference between a respective pair of locations;

and a processor for processing the first set of data values to develop a second set of data values each representing the difference between a respective pair of data values of the first set, for processing each data value of the second set and a respective reference value to develop a third set of data values, and conditioning performance of the test on the third set of data values, wherein the processor is arranged for processing the first set of data values such that it develops each data value of the second set as the absolute value of the difference between a respective pair of data values of the first set.

17. An engine as set forth in claim 16 wherein the processor is arranged for processing each data value of the second set and a respective reference value such that it compares the absolute value of each data value of the second set and the respective reference value.

18. An engine as set forth in claim 17 wherein the processor is arranged for conditioning the performance of the test on the third set of data values such that the performance is conditioned on the absolute value of none of the data values of the third set exceeding the respective reference value.

19. An engine as set forth in claim 18 wherein the processor is arranged for conditioning the performance of the test on at least one of the data values of the first set representing a temperature less than a defined temperature.

20. An engine as set forth in claim 19 wherein the processor is further arranged for processing the first set of data values and a fourth set of data values representing respective highest temperatures measured earlier at the respective locations while flow was occurring through the flow path to develop data values representing the difference between each data value of the first set and a respective data value of the fourth set, and for further conditioning performance of the test on the difference between at least one of the data values of the first set and the respective data value of the fourth set being more than a respective defined difference.

21. An engine as set forth in claim 15 wherein the flow path containing one or more emission control devices comprises an exhaust system containing more than one exhaust gas treatment device, a first temperature sensor is disposed upstream of a first exhaust gas treatment device, a second temperature sensor is disposed downstream of a second exhaust gas treatment device that is downstream of the first exhaust gas treatment device, and a third temperature sensor is disposed between the first and second exhaust gas treatment devices.

22. An internal combustion engine comprising:

an emission control system comprising temperature sensors disposed at spaced apart locations along a flow path containing one or more emission control devices; and a processor for developing a first set of data values each representing a respective temperature at a respective location, for processing the first set of data values and a second set of data values representing respective highest temperatures measured earlier at the respective locations while flow was occurring through the flow path to develop data values representing the difference between each data value of the first set and a respective data value of the second set, and for conditioning performance of the test on the difference between at least one of the data values of the first set and the respective data value of the second set being more than a respective defined difference.

23. An engine as set forth in claim 22 wherein the processor is further arranged for processing the first set of data values to develop a third set of data values each representing the difference between a respective pair of data values of the first set, for processing each data value of the third set and a respective reference value to develop a fourth set of data values, and for further conditioning performance of the test on the fourth set of data values.

24. An engine as set forth in claim 23 wherein the processor is arranged for processing the first set of data values to develop each data value of the third set as the absolute value of the difference between a respective pair of data values of the first set.

25. An engine as set forth in claim 24 wherein the processor is arranged for processing each data value of the third set and a respective reference value to compare the absolute value of each data value of the third set and the respective reference value.

26. An engine as set forth in claim 25 wherein the processor is arranged for further conditioning the performance of the test on the fourth set of data values by further conditioning the performance on the absolute value of none of the data values of the third set exceeding the respective reference value.

27. An engine as set forth in claim 26 wherein the processor is arranged for further conditioning the performance of the test on at least one of the data values of the first set representing a temperature less than a defined temperature.

28. An engine as set forth in claim 22 wherein the flow path containing one or more emission control devices comprises an exhaust system containing more than one exhaust gas treatment device, a first temperature sensor is disposed upstream of a first exhaust gas treatment device, a second temperature sensor is disposed downstream of a second exhaust gas treatment device that is downstream of the first exhaust gas treatment device, and a third temperature sensor is disposed between the first and second exhaust gas treatment devices.

* * * * *